(12) United States Patent
Frankel et al.

(10) Patent No.: US 10,105,988 B1
(45) Date of Patent: Oct. 23, 2018

(54) SUPPORT FOOT

(71) Applicant: Zenithen USA LLC, Upland, CA (US)

(72) Inventors: Andrew David Frankel, Yorba Linda, CA (US); Shi-Ping Zheng, Fuzhou (CN); Tian-Xia Zheng, Fujian (CN)

(73) Assignee: Zenithen USA, LLC, Upland, CA (US)

( * ) Notice: Subject to any disclaimer, the term of this patent is extended or adjusted under 35 U.S.C. 154(b) by 0 days.

(21) Appl. No.: 15/684,566

(22) Filed: Aug. 23, 2017

(51) Int. Cl.
*B60B 33/06* (2006.01)
*B60B 33/00* (2006.01)

(52) U.S. Cl.
CPC ........ *B60B 33/066* (2013.01); *B60B 33/0015* (2013.01); *B60B 33/0086* (2013.01); *Y10T 16/1943* (2015.01)

(58) Field of Classification Search
CPC ... B60B 33/06; B60B 33/066; B60B 33/0015; B60B 33/0086; B60B 33/0005; Y10T 16/18; Y10T 16/1943; Y10T 16/195; Y10T 16/193
USPC .................. 16/34, 35 R, 18 R, 32; 280/43.1
See application file for complete search history.

(56) References Cited

U.S. PATENT DOCUMENTS

| | | | | |
|---|---|---|---|---|
| 112,740 | A * | 3/1871 | Ryder | B60B 33/06 16/34 |
| 894,949 | A * | 8/1908 | Hendricks | B60B 33/06 16/32 |
| 2,779,049 | A * | 1/1957 | Hoddevik | B60B 33/06 16/34 |
| 3,934,304 | A * | 1/1976 | Takahashi | B60B 33/06 16/34 |

\* cited by examiner

*Primary Examiner* — William L Miller
(74) *Attorney, Agent, or Firm* — Merek, Blackmon & Voorhees, LLC

(57) ABSTRACT

A support foot where the support foot main body is composed of a ground face, support slot and long groove. The support slot is situated on the opposite side of the grounded face and the mouth is upward-opening, and a support arm is situated above the support slot. The long groove is cut through the support arm and runs parallel to the axis of the support slot, and a rivet inserted through the long groove is used to attach the support foot to the rack. This invention consists of a support foot designed as a single unit. It is attached by a single rivet and can be folded either inward for storage or outward to form a support structure by means of the connection at the support slots.

7 Claims, 3 Drawing Sheets

SUPPORT FOOT

BACKGROUND OF THE INVENTION

Field of the Invention

This invention relates to the field of support feet and specifically consists of support feet attached to tilted support bars and having folding functionality.

Technical Background

Currently there are many models of folding shelf racks, but most are difficult to open and unfold. For example, Chinese Patent Publication No. 201520384604.0 entails a folding-book storing apparatus comprising partition plates, a rack and a handrail. It has multilayered partition plates, each of which is provided with crossing tubular supports on both sides. The rack is designed in a cross shape and is connected together to allow this device to expand, to contract and to be easily stored; Finally, casters are installed on the bottom of the rack to allow for easy transport. But the placement of the casters greatly affects the folding space of the device, such as the width or thickness after folding. The object of this invention is to design a support foot that attaches to a tilted support bar and also has more dimensionally appealing folding functionality.

SUMMARY OF THE INVENTION

One purpose of this invention is to provide a type of support foot that attaches to a support bar and which has folding functionality to facilitate storage.

The technical plan of this invention is accomplished by one or more of the following:

A type of support foot with the following attributes: the support foot's main body is composed of a ground face, support slot and long groove. The support slot is situated on the opposite side of the grounded face and the mouth is upward-opening with a support arm situated above the support slot. The long groove is cut through the support arm and runs parallel to the axis of the support slot. A rivet inserted through the long groove is used to attach the support foot to the rack.

The aforementioned support slot is an upward facing arc-shaped slot with the opening of the slot itself being wider than a semicircle.

The direction of the long groove coincides with the tilted direction of the support arm, but can also be in a vertical direction.

A clip slot is located below the long groove and on the upper side of the support foot main body.

The ground face of the aforementioned support foot main body has a vertical perforation, and is equipped with a removable caster.

The caster is a universal side-brake castor.

This invention consists in part of a support foot that is designed as a single unit, and is especially suited for a folding multi-level rack, a folding clothes rack, or any other product for which it could provide ground support. The support foot only requires one rivet (or other fastener) to attach it to the tilted support bar, and this allows the support foot to rotate from low to high and clip onto the crossbar, which then allows the rack to bear weight. To collapse the rack, the support foot need only have outside force applied downward and inward, thereby causing the foot to swing away from the crossbar. This will allow the rack to be collapsed more suitably, by not taking up as much space and by reducing the width or thickness of the collapsed rack.

Figure 1:
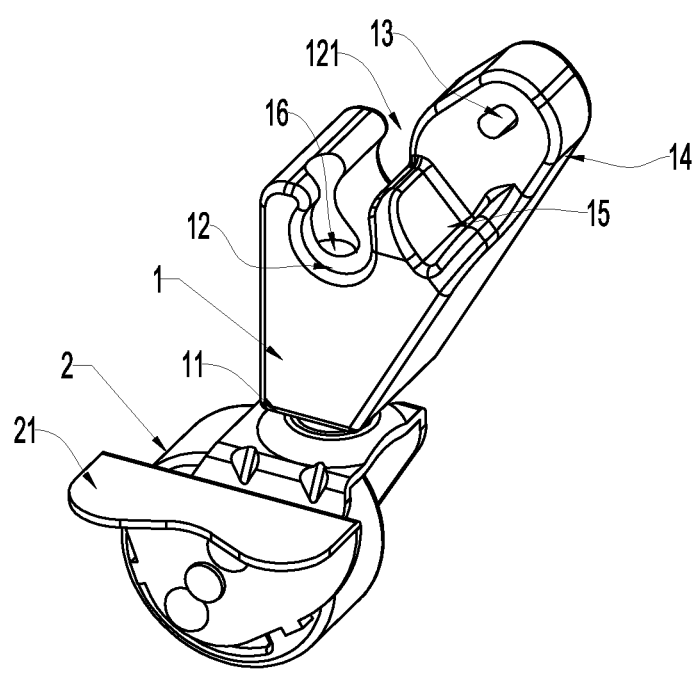
FIG. 1 shows an intact support foot.

Similar reference characters denote corresponding features consistently throughout the attached drawings. Namely, in the drawings the following reference numbers refer to the following part:
1—Support foot main body
11—Ground face
12—Support slot
121—Mouth
13—Long groove
14—Support arm
15—Clip slot
16—Perforation
2—Caster
36—Brake rocker
3—Tilted support bar
31—Crossbar
32—Shelf
4—Rivet

DETAILED DESCRIPTION OF THE PREFERRED EMBODIMENT(S)

Figure 2:
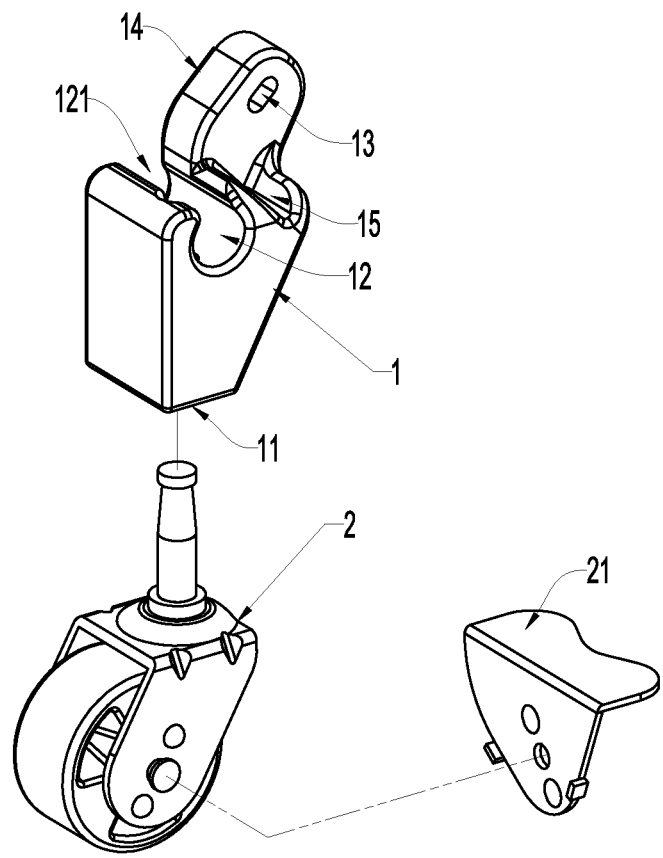
FIG. 2 shows the support foot broken down into components.

Referring to FIG. 1 and FIG. 2, both showing the support foot, the support foot main body is composed of a ground face (11), support slot (12) and long groove (13). The support slot (12) is situated on the opposite side of the ground face (11), and the mouth (121) is upward-opening. More specifically, the support slot (12) is a upward facing arc-shaped slot, with the opening of the slot itself being wider than a semicircle. This allows it to clip onto the rounded bars.

A support arm (14) is situated above the support slot (12). The long groove (13) is cut through the support arm (14) and runs parallel to the axis of the support slot (12), or in other words, in the same direction. Moreover, the direction of long groove (13) coincides with the tilted direction of the support arm (14), but can also be in a vertical direction. A rivet (or other fastener) inserted through the long groove (13) is used to attach the support foot main body (1) to the rack, thereby allowing the support foot main body (1) to rotate about where the rivet is inserted into the long groove (13). This then allows the support slot (12) to engage and disengage with the crossbar.

Next, a clip slot (15) is located below the long groove (13) and on the upper side of the support foot main body (1).

In addition to the support foot main body (1) being used directly to support the rack, there are also vertical perforations (16) bored through the ground face of the support foot that can be used to insert removable casters (2). These casters (2) are universal, side-brake casters that have brake rockers (21) allowing for the casters to be either locked or released when the rocker arm is rotated.

Figure 3:
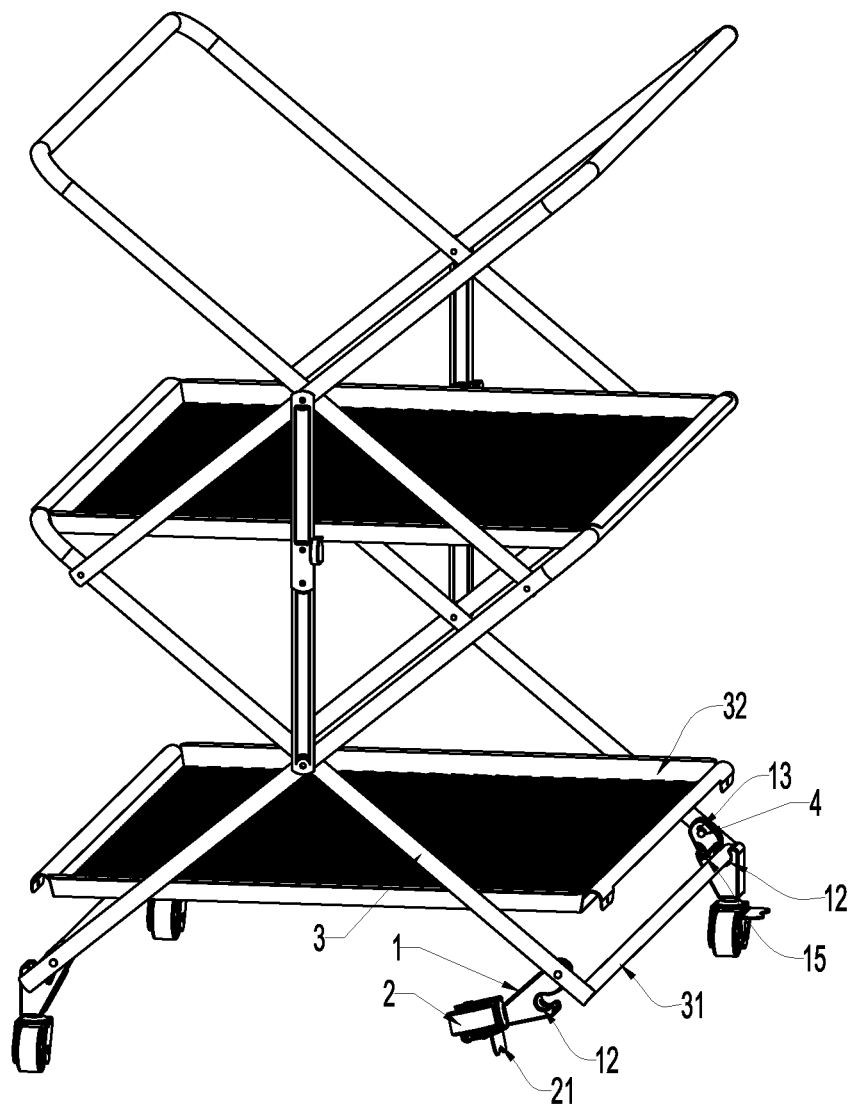
FIG. 3 shows a partial view of the folding shelf rack.

FIG. 3 provides an example of the support feet attached onto a folding multi-shelf rack. Both sides of the folding rack have folding tilted support bars (3). The support feet (3) are located on the lower ends of the rack and are attached to the crossbars (31). The shelf (32) rests on top of the crossbars (31). The support foot main bodies (1) are attached by rivets (4) onto the lower ends of the four tilted support bars (3), and are riveted (4) through the long grooves (13) on each foot. Moreover, the support foot main body (1) allows for the rack to be moved up and down by means of the rotation at the support slot, and the horizontal bars (31) can then be clipped into the support slots (12), which will allow the rack to sustain a weight load as the support foot won't be able to disengage easily. Additionally, the edges of the shelf can also be docked onto the clip slot (15) of the support foot main body (1) to provide additional constraint.

If it desired for the rack to be movable, one can choose to fit the casters (2) into ground face of the support foot main body. This will allow for the folding shelf rack to be moved easily along the casters. Also the casters are equipped with side-brake brake rockers that can be used to lock the casters, which can prevent the folding shelf rack from moving.

When the folding shelf rack is being collapsed or transported, the lower shelf can be removed and then the connected tilt support bars (3) can be folded vertically. Because the tilted support bars (3) in the collapsed position take up a certain amount of space, the support feet can be unclipped from the horizontal bars (32) and rotated inward. This will then decrease the width and thickness of the rack when it is collapsed.

We claim:

1. A support foot for a rack, comprising:
    a main body having a ground face, support slot and long groove;
    the support slot is situated on an opposite side of the ground face and has a mouth which is upward-opening, and
    a support arm is situated above the support slot;
    the long groove is cut through the support arm and has an axis therethrough which runs parallel to an axis through the support slot, and a rivet inserted through the long groove attaches the support foot to the rack.
2. The support foot of claim 1, wherein the support slot is an upward facing arc-shaped slot, with the opening of the mouth being wider than a semicircle.
3. The support foot of claim 1, wherein the long groove extends in a direction which coincides with a tilted extending direction of the support arm.
4. The support foot of claim 1, wherein the direction of the long groove is in a vertical direction.
5. The support foot of claim 1, wherein a clip slot is located below the long groove and on an upper side of the support foot main body.
6. The support foot of claim 1, wherein the ground face of the support foot main body has a vertical perforation, and is fitted with a removable caster.
7. The support foot of claim 6, wherein the caster is a universal side-brake castor.

* * * * *